(12) United States Patent
Edsall et al.

(10) Patent No.: US 9,042,230 B2
(45) Date of Patent: *May 26, 2015

(54) REAL TIME AND HIGH RESOLUTION BUFFER OCCUPANCY MONITORING AND RECORDING

(71) Applicant: Cisco Technology, Inc., San Jose, CA (US)

(72) Inventors: Thomas J. Edsall, Los Gatos, CA (US); Ganga Sudharshini Devadas, Milpitas, CA (US); Dennis Khoa Dang Nguyen, San Jose, CA (US); Chih-Tsung Huang, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/572,082

(22) Filed: Dec. 16, 2014

(65) Prior Publication Data

US 2015/0103669 A1 Apr. 16, 2015

Related U.S. Application Data

(63) Continuation of application No. 13/708,229, filed on Dec. 7, 2012, now Pat. No. 8,942,100.

(60) Provisional application No. 61/702,318, filed on Sep. 18, 2012.

(51) Int. Cl.
*H04L 12/26* (2006.01)
*H04L 12/861* (2013.01)
*H04L 12/801* (2013.01)

(52) U.S. Cl.
CPC .......... *H04L 43/0882* (2013.01); *H04L 43/045* (2013.01); *H04L 43/16* (2013.01); *H04L 49/9005* (2013.01); *H04L 47/29* (2013.01)

(58) Field of Classification Search
None
See application file for complete search history.

(56) References Cited

U.S. PATENT DOCUMENTS

| 5,938,749 | A | * | 8/1999 | Rusu et al. ..................... 710/54 |
| 6,892,237 | B1 | | 5/2005 | Gai et al. |
| 7,039,577 | B1 | | 5/2006 | Fingerhut et al. |
| 7,106,731 | B1 | | 9/2006 | Lin et al. |
| 7,395,332 | B2 | | 7/2008 | Gai et al. |

(Continued)

FOREIGN PATENT DOCUMENTS

| WO | 2005096546 A2 | 10/2005 |
| WO | WO2005096546 | * 10/2005 |

OTHER PUBLICATIONS

Cisco Systems, Inc., "Cisco Nexus 3000 Series NX-OS Release Notes, Release 5.0(3)US(1)," pp. 1-12, Aug. 31, 2011.

(Continued)

*Primary Examiner* — Afshawn Towfighi
(74) *Attorney, Agent, or Firm* — Edell, Shapiro & Finnan, LLC

(57) ABSTRACT

Presented herein are techniques for detection and characterization of buffer occupancy of a buffer in a network device. Packets are received at a network device. The packets are stored in a buffer of the network device as they are processed by the network device. An occupancy level of the buffer is sampled at a sampling rate. Occupancy levels of the buffer over time are determined from the sampling, and traffic flow through the network device is characterized based on the occupancy levels.

28 Claims, 17 Drawing Sheets

(56) References Cited

U.S. PATENT DOCUMENTS

| | | |
|---|---|---|
| 7,474,666 B2 | 1/2009 | Kloth et al. |
| 7,613,209 B1 | 11/2009 | Nguyen et al. |
| 7,656,818 B1 | 2/2010 | Baroudi et al. |
| 7,830,793 B2 | 11/2010 | Gai et al. |
| 7,899,048 B1 | 3/2011 | Walker et al. |
| 7,961,621 B2 | 6/2011 | Bergamasco et al. |
| 7,969,971 B2 | 6/2011 | Gai et al. |
| 8,208,389 B2 | 6/2012 | Alaria et al. |
| 8,640,036 B2 | 1/2014 | Pignataro et al. |

OTHER PUBLICATIONS

International Search Report and Written Opinion in International Application No. PCT/US2013/059173, mailed Dec. 5, 2013, 8 pages.

\* cited by examiner

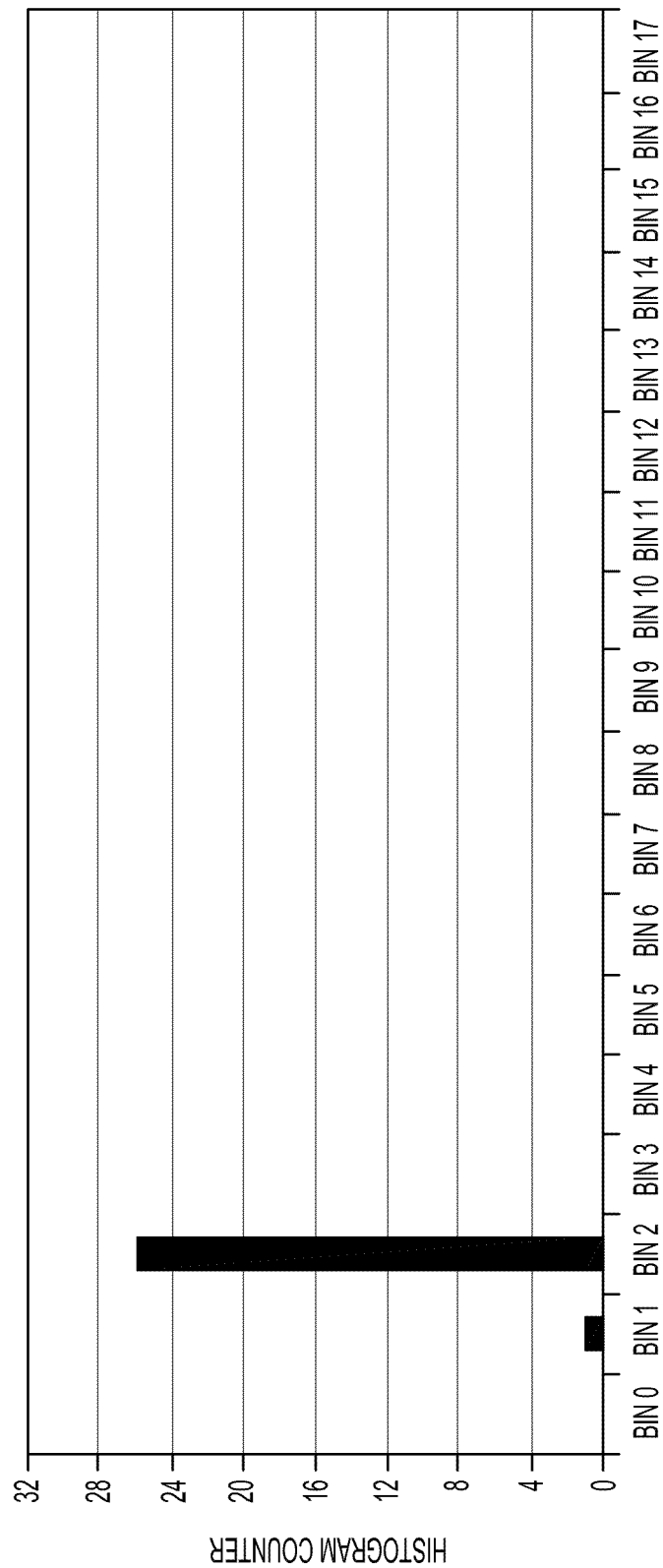

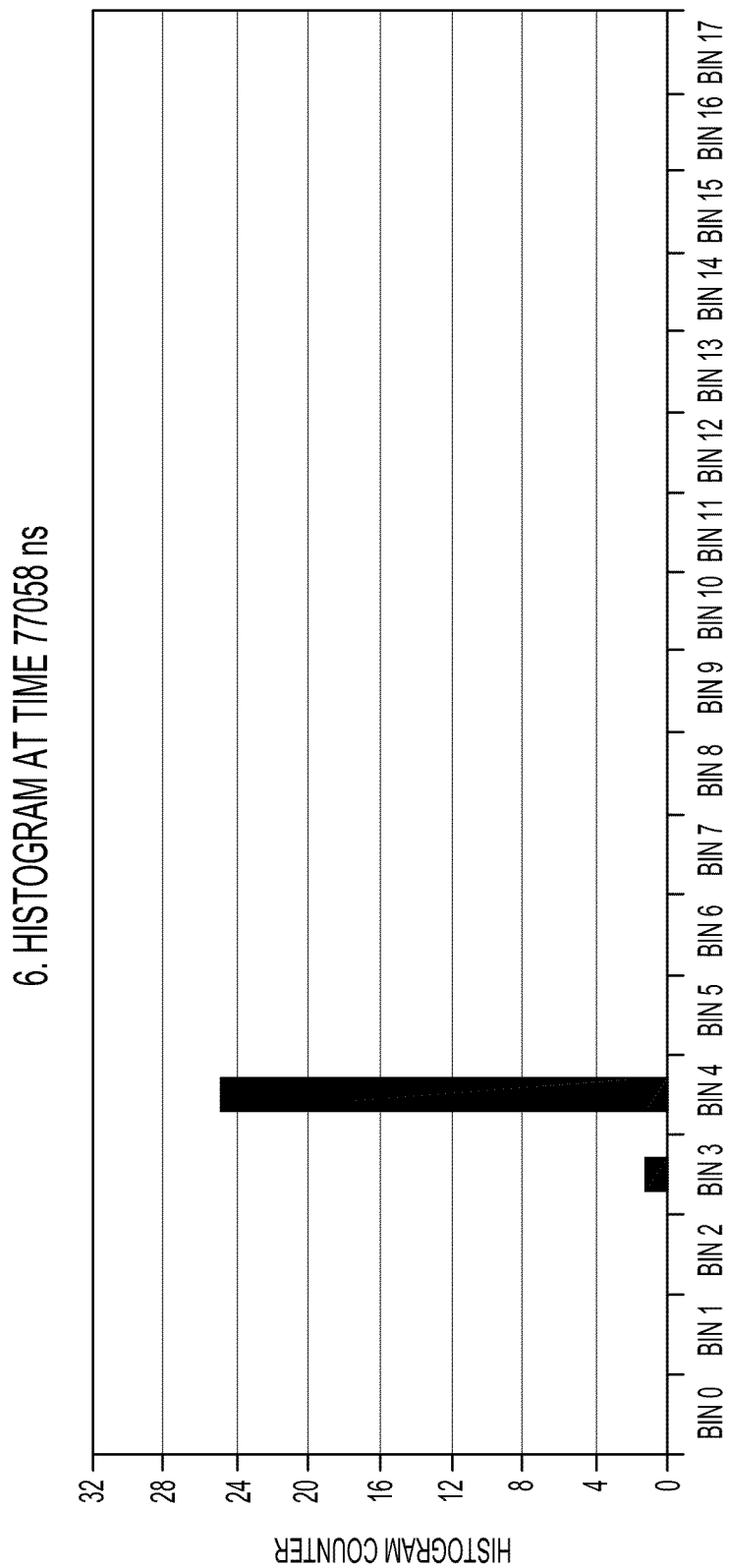

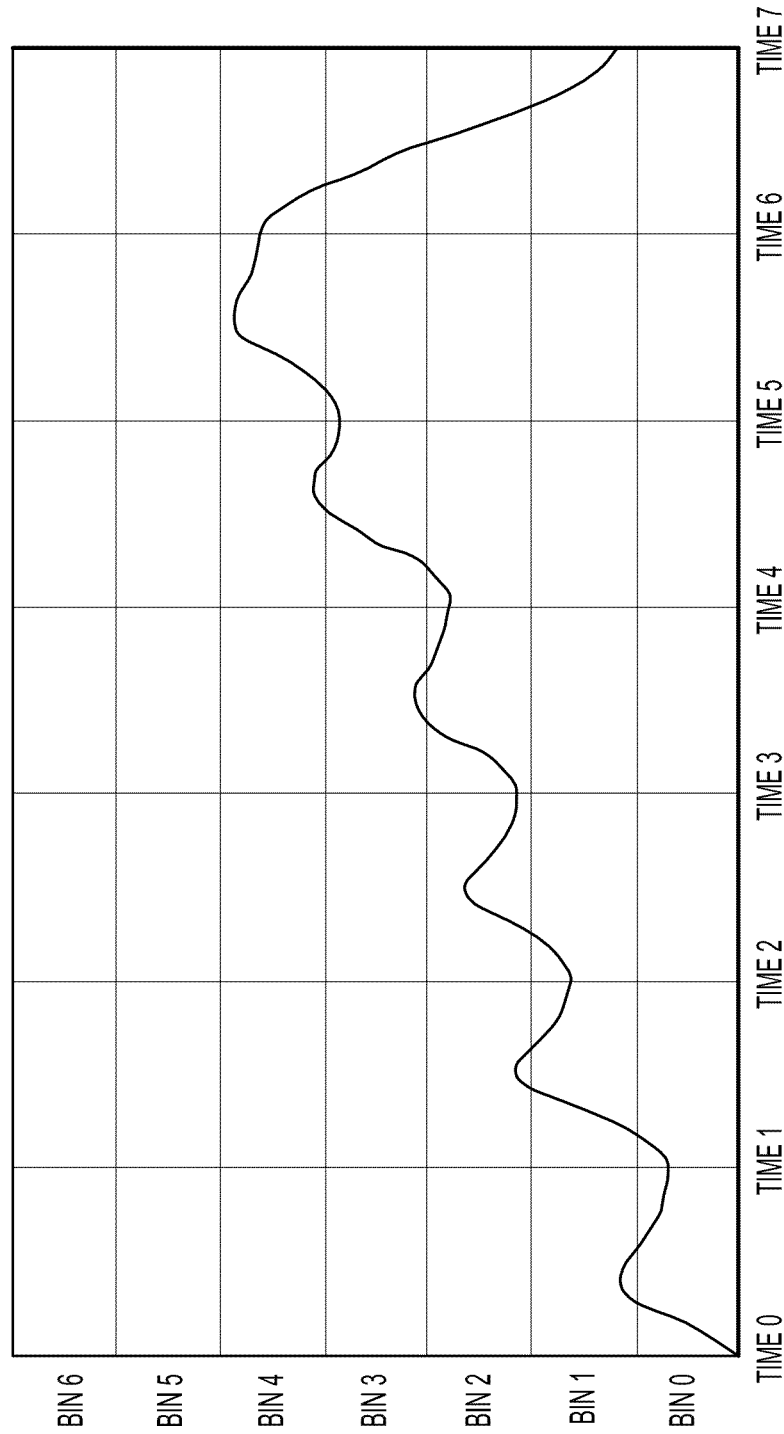

US 9,042,230 B2

REAL TIME AND HIGH RESOLUTION BUFFER OCCUPANCY MONITORING AND RECORDING

RELATED APPLICATIONS

This application is a continuation of pending U.S. patent application Ser. No. 13/708,229, filed Dec. 7, 2012, which claims priority to U.S. Provisional Application No. 61/702,318 (filed Sep. 18, 2012). Both applications are incorporated herein by reference in their entirety.

TECHNICAL FIELD

The present disclosure relates generally to monitoring the contents of a network buffer in a networking device.

BACKGROUND

In a computer network such as a data center, data is transmitted from a source to a destination in the form of packets that generally pass through one or more network devices (e.g., switches, routers, firewalls, etc.). During the transmission, packets are generally temporarily stored in one or more network buffers of the network devices.

Certain data center customers demand network architectures that can provide low latency, high bandwidth, and often massive scalability. An Ethernet switching fabric, comprised of numerous fixed switches in a flattened topology, is a network architecture that is generally used to satisfy these demands. In an Ethernet switching fabric, the fixed switches will often have a switch-on-a-chip (SOC) architecture that provides smaller network buffers than networking devices having modular or crossbar-based designs. However, even if the network buffers were large enough to accommodate all incoming traffic, excess buffering can cause any traffic to incur additional latency.

BRIEF DESCRIPTION OF THE DRAWINGS

FIGS. 10A-10F are examples of graphs corresponding to buffer usage across the entire simulation of FIG. 9.

FIGS. 11A and 11B are examples of reconstructed buffer usage graphs that may be output to a user.

DESCRIPTION OF EXAMPLE EMBODIMENTS

Overview

Presented herein are techniques for detection and characterization of buffer occupancy at a microsecond scale, using histogram-style sampling of the occupancy of a network buffer in a network device. The techniques presented herein also include associated processes for collecting and interpreting the resulting data.

One technique for detecting and characterizing buffer occupancy includes storing packets in a buffer of the network device as they are processed by the network device, sampling an occupancy level of the buffer at a sampling rate, tracking occupancy levels of the buffer over time determined from the sampling, and characterizing traffic flow through the network device based on the occupancy levels.

Example Embodiments

Figure 1:
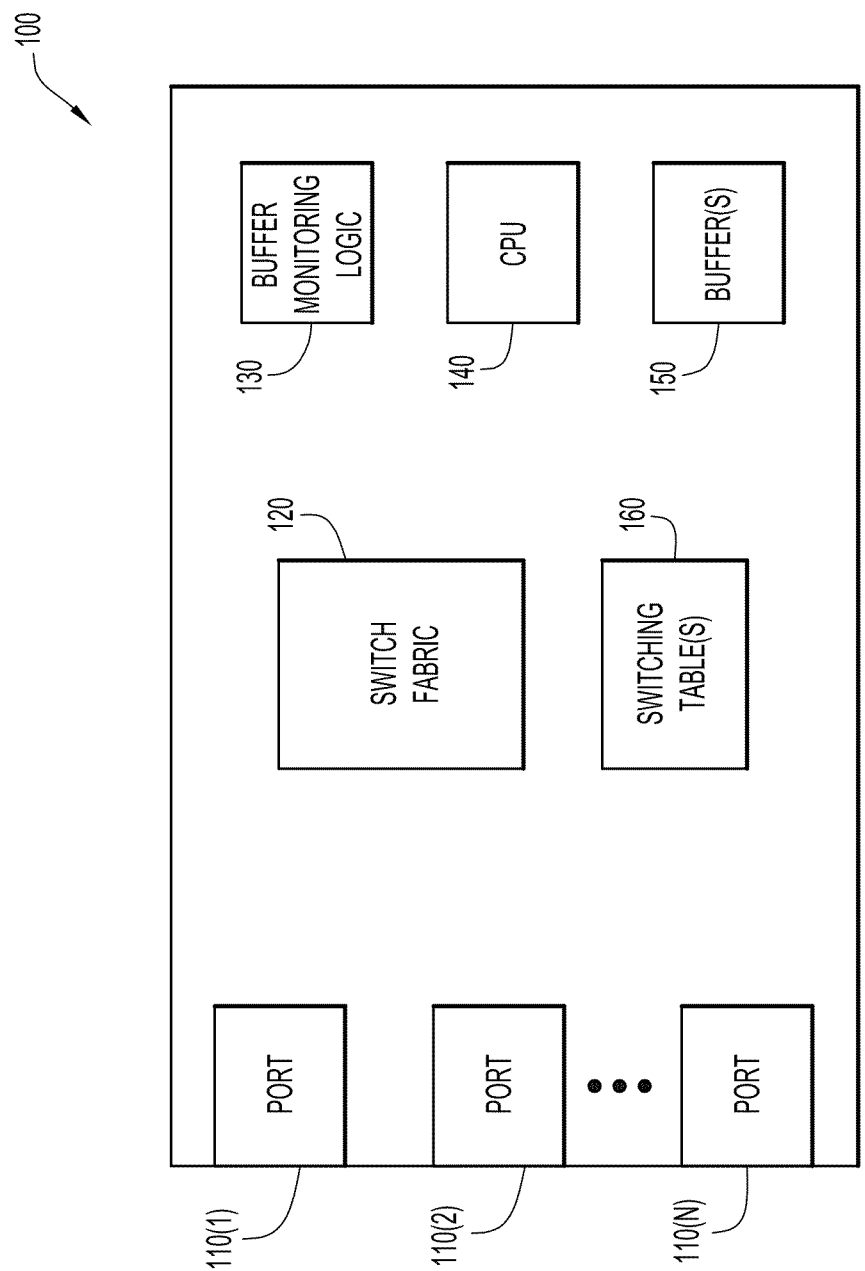
FIG. 1 is a block diagram of a network device configured to monitor a buffer in a network device, according to the techniques presented herein.

A growing segment of network users, such as financial firms, demand sub-microsecond latency from data center equipment. Any unaccounted-for buffering will incur noticeable latency penalties that may have a negative impact on the data center performance. Other customers operate in environments in which a given end server or virtual machine will receive a massive amount of traffic in a microsecond-scale burst (for example, an in-cast at the end of a search query). Microbursts can overwhelm buffers near the data center edge, and cause traffic disruptions (dropped packets or latency penalties) that appear and disappear spontaneously. Presented herein are networking buffer monitoring techniques to determine buffer occupancy levels and to characterize traffic flow through a network device based on the determined buffer occupancy levels. FIG. 1 is an example of a block diagram of a network device configured to perform the network buffer monitoring techniques presented herein. The network device 100 includes ports 110(1)-110(N), switch fabric 120, buffer monitoring logic 130, a central processing unit (CPU) 140, one or more buffer(s) 150, and switching table(s) 160. The network device 100 may correspond to a network switch, for example. It is to be appreciated that the network buffer monitoring techniques may be implemented in one or more application specific integrated circuits (ASICs) in digital logic gates, or by a processor that executes instructions stored in a tangible (non-transitory) processor readable memory storage media, e.g., Read Only Memory (ROM), Random Access Memory (RAM) or other non-transitory memory storage device. In a specific example presented herein, the buffer monitoring techniques are hardware assisted.

In a case where the network device 100 is a network switch, packets arriving at one of the ports 110(1)-110(N) is switched to another one of the ports 110(1)-110(N) by the switch fabric 120, which can be configured as a crossbar switch in some implementations. Switching table(s) 160 is referenced by CPU 140 to control the switch fabric 120 to switch a packet received from one of the ports 110(1)-110(N) to be output on another of the ports 110(1)-110(N). The packet may be buffered by buffer(s) 150 based on current conditions at the network switch 100. Buffer monitoring logic 130 monitors the occupancy of the buffer(s) 150, and samples the buffer(s) 150 with hardware to provide buffer occupancy history information that may be useful in detecting and assessing abnormal network conditions such as a packet microburst that results in network congestion and packet loss. Accordingly, techniques are presented herein for a mechanism to sample with a sub-microsecond sampling period the occupancy of a given buffer in a network device (e.g., network switch).

Figure 2:
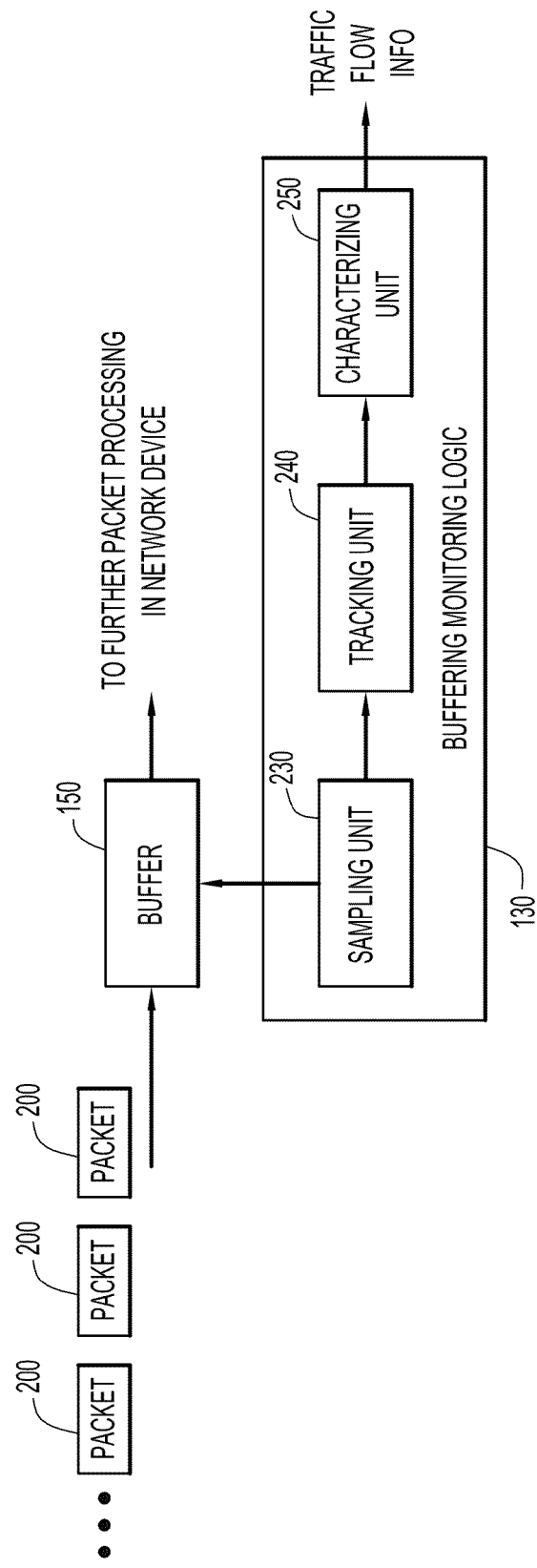
FIG. 2 is a block diagram of buffer monitoring logic configured to monitor a buffer in a network device.

Reference is now made to FIG. 2. FIG. 2 illustrates a block diagram of one possible implementation of the buffer monitoring logic 130 that monitors buffer occupancy levels of a buffer 150, and provides buffer occupancy level information for use in analyzing the operation of one or more buffers. The buffer monitoring logic 130 may be fully implemented in hardware, such as in an Application Specific Integrated Circuit (ASIC), for example. In other implementations, the buffer monitoring logic 130 includes both hardware and software elements.

Packets 200 are received, e.g., at an ingress port of a network device, e.g., network device 100 shown in FIG. 1. The buffer 150 stores the received packets 200. The packets stored in the buffer 150 can then be read out for processing by the network device 100. For example, information within the packets 200 can be read and from that, it can be determined the best route to send each of the packets 200 on its way to a destination unit within the network. The choice of which buffer to store a packet may be based on ingress port, egress port, and/or priority (of the packet), for example. Instantaneous and long term (histogram) buffer occupancy of each queue may be generated. Moreover, queues may be allocated based on ingress port and priority {ingress port, priority), egress port and priority {egress port, priority}, ingress port alone {ingress port}, egress port alone {egress port}, and priority alone {priority}.

The buffer monitoring logic 130 comprises a sampling unit 230, a tracking unit 240 and a characterizing unit 250. The sampling unit 230 samples the occupancy level of the buffer 150 at a sampling rate, preferably at a very fast sampling rate in order to track microburst conditions that may affect the buffer. By way of example, the sampling rate can be every 50-100 nanoseconds. The sampling unit 230 may be implemented in hardware e.g., digital logic gates in an ASIC.

The tracking unit 240 tracks the occupancy levels of the buffer 150 over a period of time, as determined from multiple samplings of the buffer 150 as made by the sampling unit 230. By way of example, the tracking unit 240 may track the occupancy level of the buffer 150 over a 10 microsecond period, based on a 1/100 nanosecond sampling rate, in which 100 separate buffer occupancy level samples would be obtained during that 10 microsecond time period.

The characterizing unit 250 receives the tracked occupancy levels as output by the tracking unit 240, and uses that information to characterize traffic flow through the network device during the period of time (e.g., during the 10 microsecond time period). For example, if the buffer occupancy levels indicate that a buffer full condition existed for at least a portion of that time period, then the characterizing unit 250 may determine that a congestion condition existed in the network device during this time period, whereby resources may be reallocated within the network device to try to alleviate or totally overcome the congestion condition. By way of example, the buffer which had a buffer full condition may be reassigned so as to receive a reduced rate of packets incoming from the network, and another buffer which had a buffer low occupancy condition during that same time period may be reassigned so as to receive a greater rate of packets incoming from the network. This load balancing of buffers may then result in a better operational state of the network device for future time periods.

Figure 3:
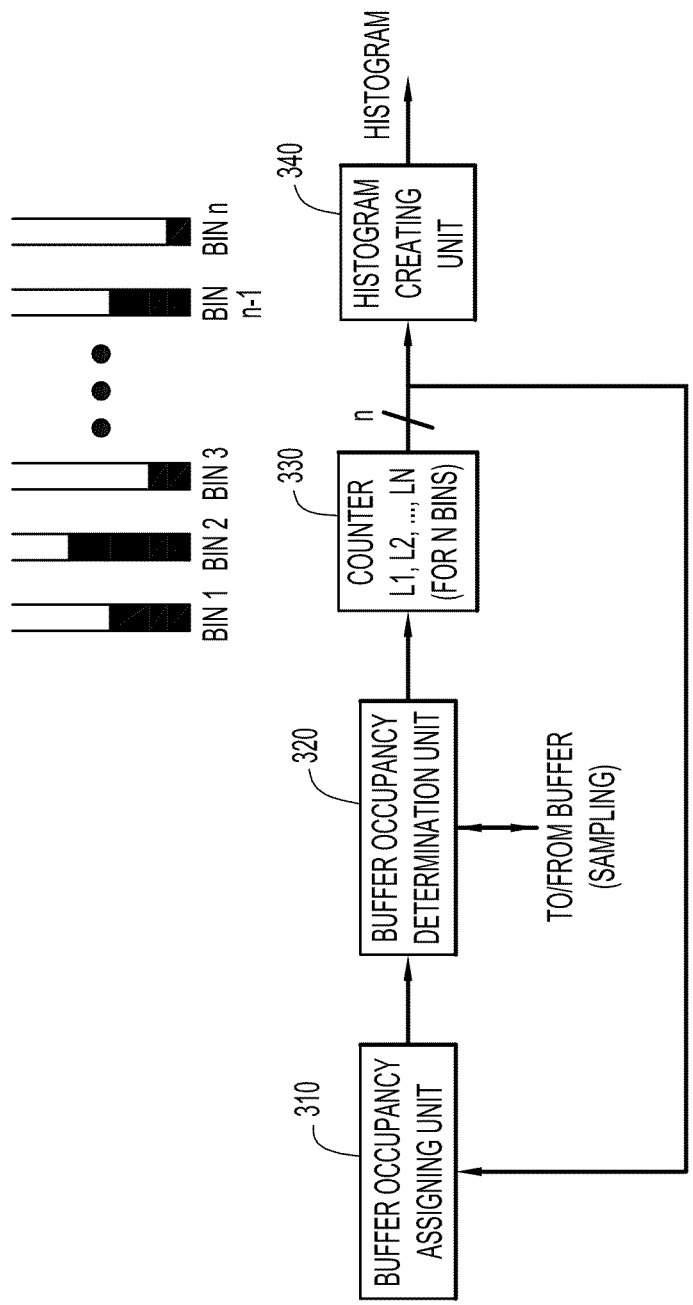
FIG. 3 is a block diagram of additional components of the buffer monitoring logic.

FIG. 3 is a block diagram of one possible implementation of the tracking unit 240. The tracking unit 240 comprises a buffer occupancy assigning unit 310, a buffer occupancy determination unit 320, a counter 330 and a histogram creating unit 340. Buffer occupancy ranges of a buffer are respectively assigned to bins, whereby those buffer occupancy ranges can be reassigned based on recent buffer occupancy information of the buffer. Buffer occupancy assigning unit 310 assigns n buffer occupancy ranges of a buffer to n bins, in which n is a positive integer greater than two (2). Initially, this can be done by dividing up the buffer into n bins, with each bin associated with a corresponding occupancy level range in the buffer). Buffer occupancy determination unit 320 determines a buffer occupancy level at every sampling period, such as every microsecond. Based on the buffer occupancy level as output by the buffer occupancy determination unit 320, the counter 330 increments, by one, a counter value $L1, \ldots, Ln$ assigned to one of the n bins (bin1, bin2, bin3, ..., bin n). When a predetermined monitoring time has ended, the counter 330 outputs the counter values $L1, \ldots, Ln$, which are then provided to the histogram creation unit 340, for providing a visual indication of the buffer occupancy in the form of a histogram to a user. The current count value of each of the bins bin1, bin2, bin3, ..., bin n−1, bin n is shown in FIG. 3 by way of the darkened area within each of those bins.

Each bin may be accumulated for a range of buffer occupancy level (e.g., 0-64 bytes, 65-128 bytes, ..., 1024-9216 bytes) based on allocation of a plurality of queues assigned to the buffer. For example, a first bin is assigned to buffer occupancy of 0-64 bytes that are written to the buffer, a second bin is assigned to buffer occupancy of 65-128 bytes that are written to the buffer, etc. The buffer occupancy level ranges assigned to each bin for a given bank of bins depends on the combination of any one or more of the ingress port, egress port and packet priority that subscribes to the use of the bank of bins.

Based on the counter values $L1, \ldots, Ln$, such as when counter value L3 exceeds its maximum value, that counter value L3 output by counter 330 may cause the buffer occupancy assigning unit 310 to reassign the bin occupancy level ranges for the buffer. In this example, the Bin 3 that resulted in a saturated counter value L3 (e.g., a value equal to 256) for a particular time period may have its buffer occupancy range decreased, so as to obtain a finer granularity of the buffer occupancy in the buffer occupancy region previously covered by Bin 3. That is, Bin 3 and Bin 4 can be reassigned to cover a lower half and an upper half, respectively, of the buffer occupancy range previously covered by Bin 3 alone.

In some implementations, two adjacent bins can be assigned to adjacent buffer occupancy level ranges of 4 bytes each (e.g., 27-30 bytes assigned to Bin 3, 31-34 bytes assigned to Bin 4), to achieve a desired level of granularity to analyze buffer activity with respect to certain occupancy ranges.

By allocating bins to the buffer occupancy level in the manner described above, the histogram obtained may provide an indication of the amount of data written into the buffer over a period of time. Bursts of packets can be identified based on the bin or bins that experience a large rise in count value over a particular time period, which in turn may indicate which queues were overloaded.

For example, a histogram may be generated for a total occupancy, an average occupancy, and a standard deviation of occupancy over a period of time. Also, in cases where a queue of a particular ingress/egress port pair or a queue of a packet priority level is utilized to write to the buffer, a bin/queue occupancy histogram can be generated based on the count values obtained for each bin over a particular time period.

Figure 4:
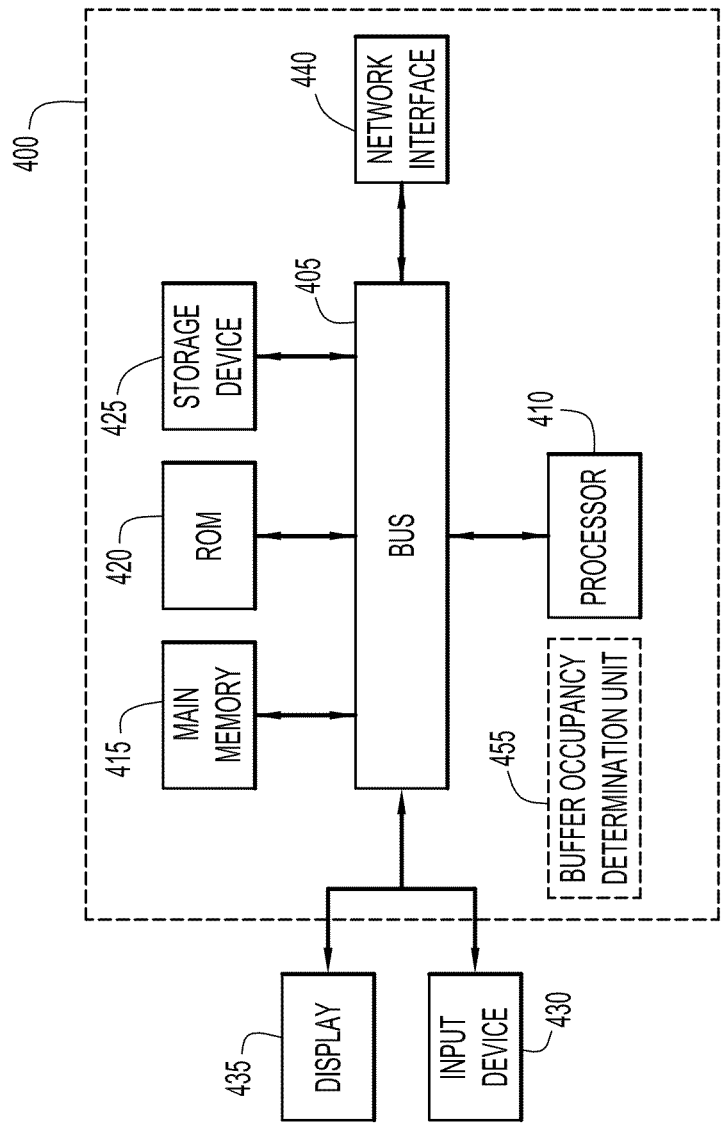
FIG. 4 is a block diagram of a computing system configured to monitor a network buffer.

FIG. 4 illustrates a depiction of a computing system 400. The computing system 400 includes a bus 405 or other communication mechanism for communicating information and a processor 410 coupled to the bus 405 for processing information. The computing system 400 also includes main memory 445, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 410 or other static (non-transitory) storage device coupled to the bus 405 for storing static information and instructions for the processor 410. A storage device 425, such as a solid state device, magnetic disk or optical disk, is coupled to the bus 405 for persistently storing information and instructions. Buffer occupancy determination logic 455, includes executable instructions which may be stored in main memory 415, ROM 420 and/or storage device 425, and which also may include some hardware logic components. The buffer occupancy determination unit 455 is utilized by processor 410 to perform the buffer occupancy determination and related operations as described herein.

The computing system 400 may be coupled via the bus 405 to a display 435, such as a liquid crystal display, or active matrix display, for displaying information to a user, such a buffer occupancy histogram that shows a buffer occupancy level during a particular time period. An input device 430, such as a keyboard including alphanumeric and other keys, may be coupled to the bus 405 for communicating information, and command selections to the processor 410. In another implementation, the input device 430 has a touch screen display 435. The input device 430 can include a cursor control, such as a mouse, a trackball, or cursor direction keys, for communicating direction information and command selections to the processor 410 and for controlling cursor movement on the display 435.

According to various implementations of the techniques described herein, the processes that effectuate illustrative implementations that are described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to implement illustrative implementations. Thus, implementations are not limited to any specific combination of hardware circuitry and software.

Figure 5:
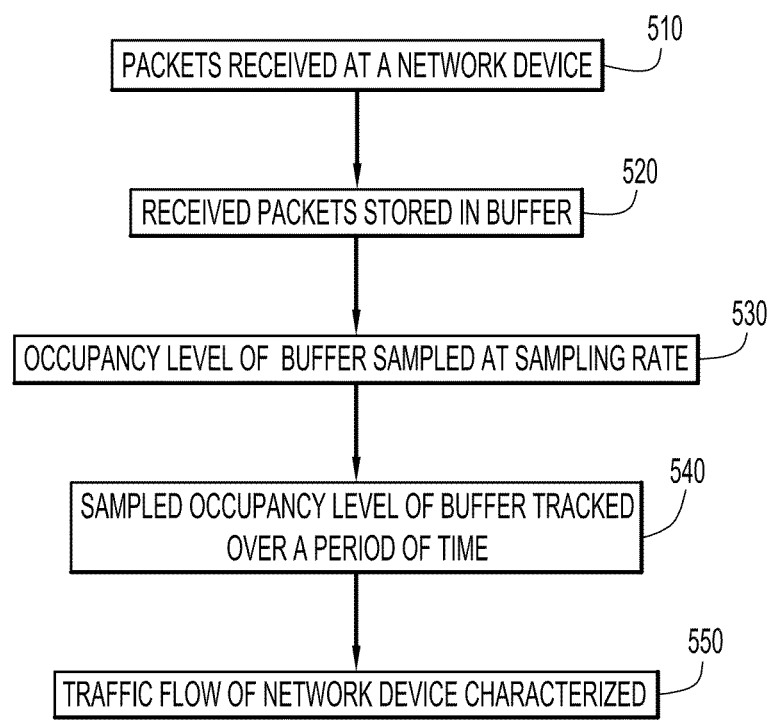
FIG. 5 is a flow diagram of a method of monitoring a network buffer in order to obtain buffer occupancy data.

FIG. 5 is a flow diagram illustrating a method of tracking buffer occupancy level according to techniques described herein. In step 510, packets are received at a network device. In step 520, the received packets are stored in a buffer of the network device as they are processed by the network device. In step 530, an occupancy level of the buffer is sampled at a sampling rate. Bins can be sampled upon packet arrival or over time. In step 540, the occupancy levels of the buffer over a period of time as determined from the sampling is tracked. In step 550, traffic flow through the network device is characterized based on the tracked occupancy levels over the period of time.

In general, the sampling, tracking and characterizing steps 520, 530, 540 can be performed based on one or more of: Layer 2 parameters, Layer 3 parameters, Layer 4 parameter, packet payload, packet priority parameters, and any user defined parameter.

Figure 6:
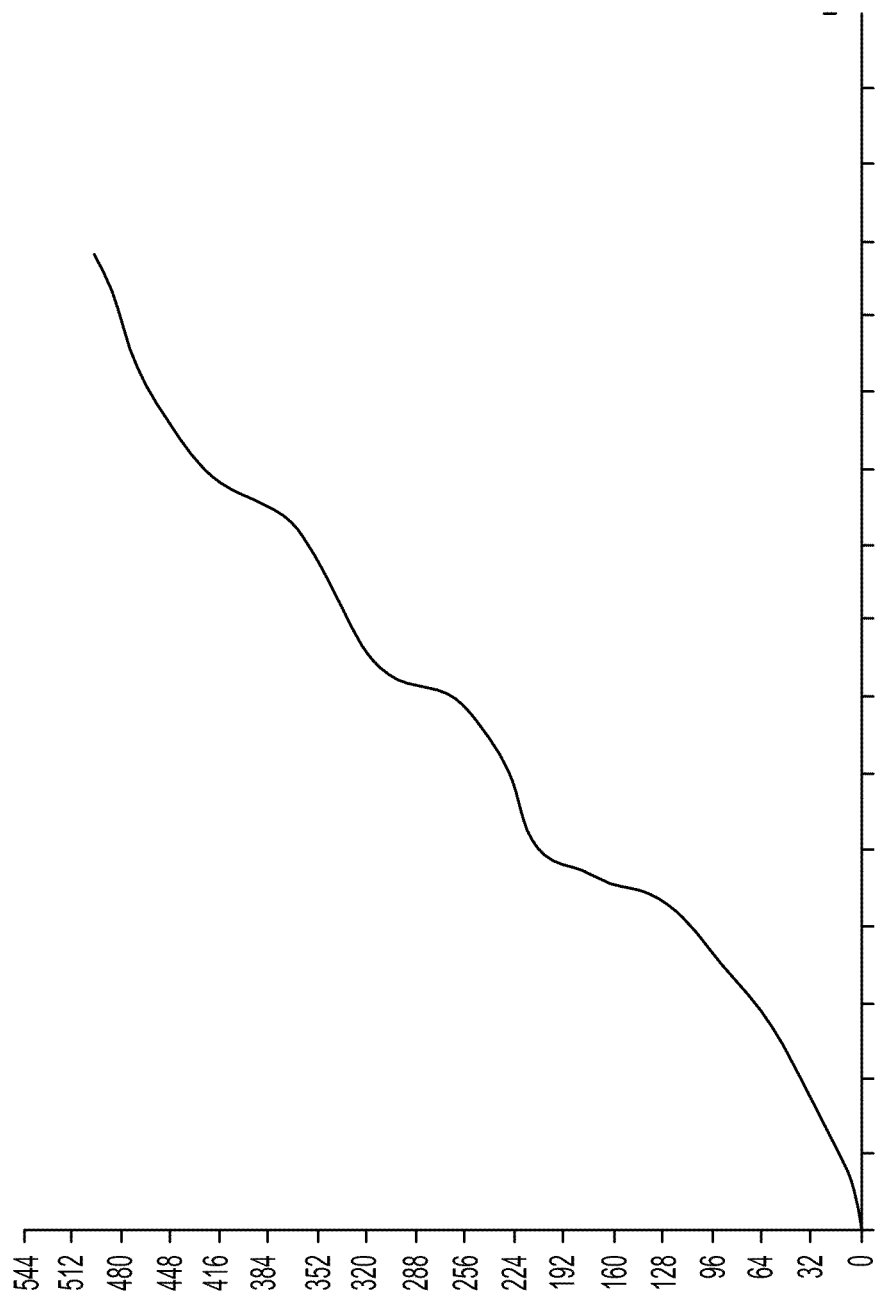
FIG. 6 is an example graph representing network buffer occupancy that may be output to a user.
Figure 7:
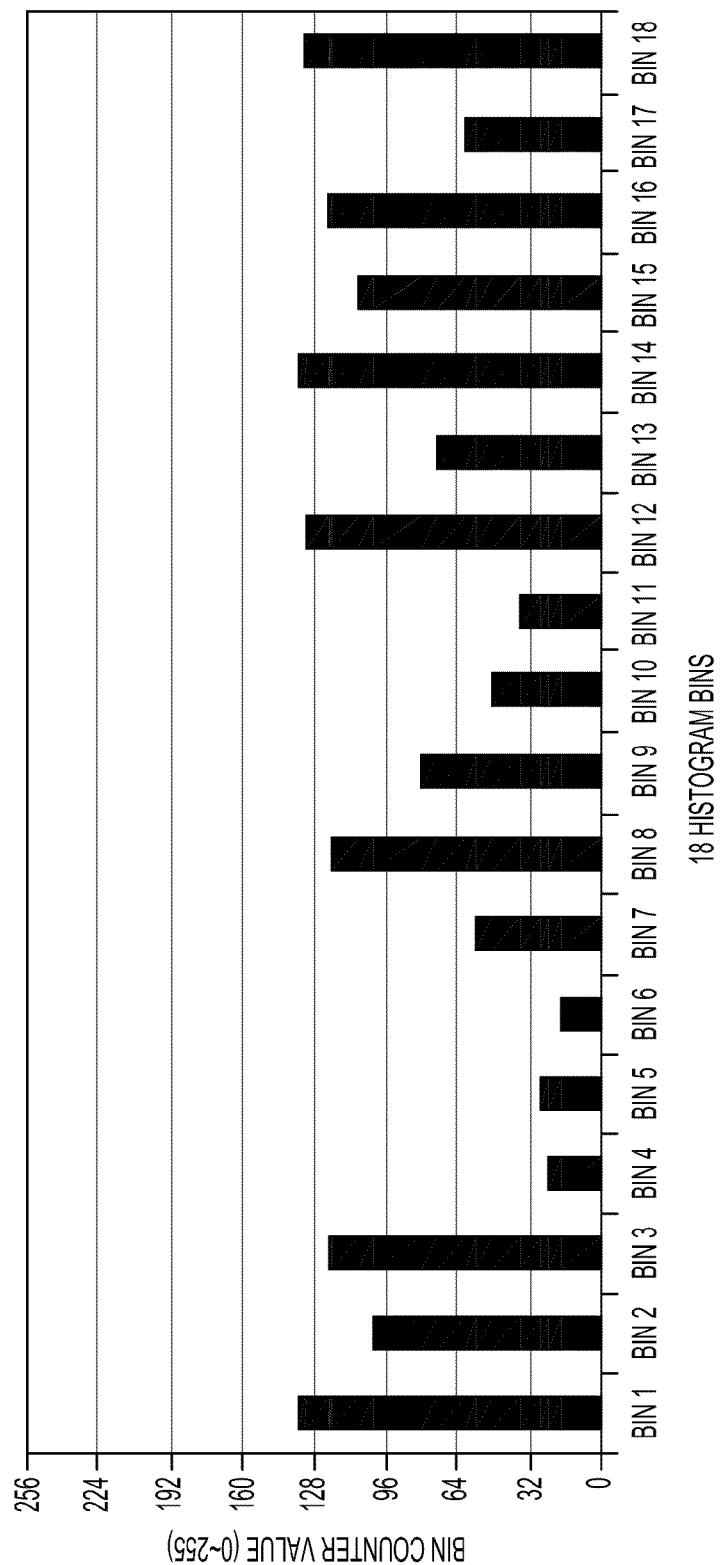
FIG. 7 illustrates an example of a histogram graph that may be output to a user to show buffer occupancy during a particular time period.

Reference is now made to FIGS. 6 and 7. FIG. 6 is an example graph representing buffer occupancy in pages as time progresses, which may be determined by the tracking unit 240. In this example, seventeen (17) threshold values can be set in histogram registers resulting in eighteen (18) bins bound by the thresholds in the histogram graph shown in FIG. 7. To create a histogram, the data (which in this case is the whole buffer occupancy) is sampled at regular intervals, set by values of a register. The counter for a bin is incremented when it is discovered, after sampling, that the buffer occupancy value is within the range of that bin. It is to be appreciated that the graphs of FIGS. 6 and 7 are not correlated to one another, as the buffer occupancy amount in pages as shown in FIG. 6 may not exactly match the histogram bin occupancy values as shown in FIG. 7.

With reference to FIG. 7 in particular, techniques are also provided for reconfiguring during operation a sub-microsecond sampling period, to support shorter or longer sampling periods, or to adapt to desired CPU utilization parameters or counter sizes. Additionally, the techniques presented herein may involve a mechanism by which the aforementioned buffer occupancy samples are aggregated into a number of bins (n bins). Eighteen (18) such bins are shown in FIG. 7, for dividing up a buffer into 18 buffer occupancy levels. These n bins may be available to be read and cleared for further counting by a software process installed on the network device. The software process is able to read and clear these bins at a sampling interval in the millisecond or second domain.

The techniques presented herein may further provide a mechanism by which the n bins have n−1 upper thresholds that may be statically or dynamically configurable by a software process. In FIG. 7, the upper counter size for each of the 18 bins is set to 256 (that is, up to 256 samples of a particular bin's occupancy level within a particular time period can be shown in the histogram). The upper buffer occupancy thresholds may then be used to sort and aggregate the samples. A bin may increment when a sample is less than a selected bin's corresponding upper threshold, and more than an adjacent lesser bin's upper threshold (which can be set to 0 for the 0th bin). Samples higher than all configured thresholds can be placed in a final nth bin. The techniques presented herein may also provide a dedicated set of m buffer counter groups (with the aforementioned n sampling bins each) which can be switched between m buffers for a particular selectable port, or m ports in a port group.

Histogram bins, along with instantaneous buffer occupancies, may be collected, recorded, and interpreted to construct a time-based profile of buffer occupancy at a millisecond or sub-millisecond scale. Assuming most nonzero bins lie between the instantaneous occupancies at the beginning and the end of a software sampling period, a process can use the bin counts (interpreted as time spent in a particular occupancy range) to construct an estimated time course for buffer occupancy.

Moreover, the histogram bins, along with instantaneous buffer occupancies, can be collected, recorded, and interpreted to detect traffic bursts at a microsecond or sub-microsecond scale. Given a situation where there are nonzero bins significantly greater than the instantaneous buffer occupancies at the beginning and end of a software sampling interval, it may be concluded that there was a microburst in that interval.

The hardware sampling parameters may be dynamically adapted to best characterize systemic bursts that the foregoing methods detect. For example, if the nth (overflow) bin is found to be nonzero, the process may re-scale the n bin thresholds to higher values such that the magnitude of future similar bursts may be better characterized. Likewise, if a given burst or traffic pattern only triggers the smallest bins, the process may re-scale the n bin thresholds to capture any future bursts with finer granularity. Additionally, if a given traffic pattern causes the buffer occupancy to hover between a particular set of values, the process may re-scale the n bin thresholds to "focus" on that range of values to characterize the traffic with finer granularity. These re-scaling processes may be additive, multiplicative, or any combination thereof, with configurable re-scaling factors.

Microbursts and their magnitudes and/or durations may be recorded, counted, and interpreted to indicate severity of microsecond-scale congestion events on a network device. This severity, as well as counts, magnitudes, durations, and frequency of events, may be displayed to the network administrator to allow the administrator to re-configure devices, activate countermeasures, or do further debugging. In certain examples, the microburst event severity may be displayed in the form of a red/yellow/green indicator, either through a software interface, or an indicator on the device.

Each bar in the histogram graph of FIG. 7 is a metric of time. The longer the bar for a bin, the longer the buffer occupancy stayed within the range of that bin. From the example histogram graph of FIG. 7, it can be deduced that the time for the buffer occupancy level to transition through thresholds 1 to 3 (of bins 1 to 3) was much greater than time required for occupancy level to shoot up to threshold 8 (of bin 8) past thresholds 4 to 7 (of bins 4 to 7). The counters assigned to each of those bins may clear following a read of the counters.

The buffer that is the basis of the histogram data in FIG. 7 may be initially divided into 18 bins respectively allocated to 18 different occupancy level ranges of equal size. That is, bin 1 is allocated to occupancy level ranging from 1 byte up to 8 bytes, bin 2 is allocated to occupancy level ranging from 9 bytes to 16 bytes, bin 3 is allocated to occupancy level ranging from 17 byte to 24 bytes, etc. This effectively partitions the buffer into 18 buffer occupancy levels that can track the buffer occupancy level over a particular period of time. For a buffer having a capacity of 1800 bytes of storage for packets, each buffer fill region may correspond to 100 bytes in size. That is, Bin 1 corresponds to a buffer occupancy between 0 and 99 bytes, Bin 2 corresponds to a buffer occupancy between 100 and 199 bytes, . . . , up to Bin 18 corresponds to a buffer occupancy between 1700 and 1799 bytes. When a buffer occupancy sample is taken by the sampling unit 230 of FIG. 2, e.g., every 0.1 nanoseconds, the buffer occupancy level at each of those times is placed in the appropriate bin, and the counter assigned for that bin is incremented by the tracking unit 240. If the buffer occupancy level is 165 bytes at a particular sampling time, then the counter for Bin 17 is incremented by one to reflect that measurement. If the buffer occupancy level is 168 bytes at the next sampling time (e.g., 0.1 nanoseconds after the previous sampling time), then the counter for Bin 17 is incremented by one again. If the buffer occupancy amount is 158 bytes for the next sampling time, then the counter for Bin 16 is incremented by one. For a predetermined period of time (e.g., for 1000 consecutive samplings times), the counter values for each of bins can be read, and a histogram of the buffer occupancy level obtained and output by the tracking unit 230, such as the histogram shown in FIG. 7. The histogram can then be utilized to determine whether a congestion condition exists for the network device, and also to determine an appropriate action to take to improve packet flow through the network device.

As an alternative to spanning the entire range of possible buffer occupancy levels as described above, the 18 bins may span only a portion of the possible buffer occupancy levels, such as from a zero (0) buffer occupancy level to a 75% buffer occupancy level. If the highest bin reaches a saturation count value (e.g., it reaches its maximum count value), then the bins may be resized so as to cover a greater portion of the possible buffer occupancy levels, such as from 0 up to a 90% buffer occupancy level.

Further, in cases where a queue is assigned to an ingress port, or to an ingress port/egress port pair, or to packets of a particular priority, buffer occupancy due to packets assigned to that queue can be determined based on the techniques described above. For example, if buffer occupancy due to packets arriving at Port 33 is desired, then a bank of bins is allocated to traffic for that port and the binning of only those packets that are assigned to a queue associated with Port 33 is considered for that bank of bins. Or, if buffer occupancy due to packets of a particular priority is desired, then a bank of bins is allocated for that particular priority, and the binning of only packets of that particular priority is considered for that bank of bins.

The monitoring of the buffer occupancy level at any particular sampling time by the tracking unit 240 of FIG. 2 may be done by hardware, e.g., digital logic gates, in order to achieve a super-fast sampling of the buffer useful in detecting microburst conditions, such as when a large amount of packets arrive at the buffer in a very short time frame (e.g., during a packet microburst condition within the network).

In cases where a particular portion of the buffer is shown to be occupied more than other portions of the buffer, such as bins 1, 2, and 3 in FIG. 7 indicating that a low buffer occupancy, the bins can be resized by the sampling unit 230 (under control of the tracking unit 240) in order to hone in on those bins, by effectively creating more than three bins to cover the same buffer occupancy level ranges previously covered by bins 1, 2, and 3. By way of example, bins 1, 2 and 3 can be resized to cover buffer occupancies one-half as large as their current size, and bins 4, 5 and 6 can be resized to cover the remaining buffer occupancy level that was previously covered by bins 1, 2, and 3, thereby providing a 50% increase in buffer occupancy granularity for packets of a certain size range.

Furthermore, bin 8 can be resized to cover a smaller buffer occupancy range in a similar manner as discussed above with respect to bins 1, 2 and 3, to provide finer granularity at an intermediate level occupancy portion of the buffer. The resizing of the bins may be automatically performed in some implementations. This resizing can be done when a bin counter value is greater than a first predetermined value for at least n buffer sampling time periods (n being a positive integer greater than two), whereby the buffer occupancy range of that bin is decreased, in order to obtain a finer granularity as to the buffer occupancy levels within that portion of the buffer. Also, this resizing can be done when a bin counter value is less than a second predetermined value for n buffer sampling time periods, so that the buffer occupancy range of that bin is increased, in order to obtain a higher granularity as to the buffer occupancy levels within that portion of the buffer (to allow for other bins that have more occupancy to have their respective buffer occupancy ranges decreased).

For example, bins 1, 2 and 3 may be resized so as to each cover a buffer occupancy range of $1/36^{th}$ the total size of the buffer (e.g., bin 1 covers a range from buffer empty to one byte less than $1/36^{th}$ full, bin 2 covers a range from $1/36^{th}$ full to one byte less than $1/18^{th}$ full, and bin 3 covers a range from $1/18^{th}$ full to one byte less than $3/36^{th}$ full), and bins 4, 5 and 6 may be modified so as to each cover a buffer occupancy range that is larger than their respective previous buffer occupancy ranges.

The counts associated with the bins allocated to different buffer occupancy level ranges may be set to values to cover from a buffer empty condition to a buffer full condition, or some portion of that range (e.g., from a ¼ buffer full condition to a ¾ buffer full condition, or from a buffer empty condition to a ¾ buffer full condition), if that is a buffer occupancy region of interest. As such, a desired level of granularity can be obtained to monitor a particular portion of a buffer occupancy range, by setting the bin sizes appropriately. While FIG. 7 shows 18 bins that are capable of being assigned to 18 buffer occupancy ranges, it should be appreciated that other numbers of bins may be assigned to various occupancy level ranges of a buffer based on the hardware utilized to monitor the occupancy of the buffer, while remaining within the spirit and scope of the techniques described herein.

In some implementations, for a count value of zero, the bin assigned to a smallest buffer occupancy range of the buffer will count the zero as a valid counter value and may ultimately saturate. Therefore, in some implementations, the buffer occupancy of zero will not result in an increase of the counter value for that bin.

The histogram representation of FIG. 7 also provides a macro-view of the buffer's occupancy throughout the sampling period, which may be superior to a simple graph of time vs. occupancy. By reading the histogram counters at regular intervals, the buffer occupancy graph may be reconstructed, if desired.

Figure 8:
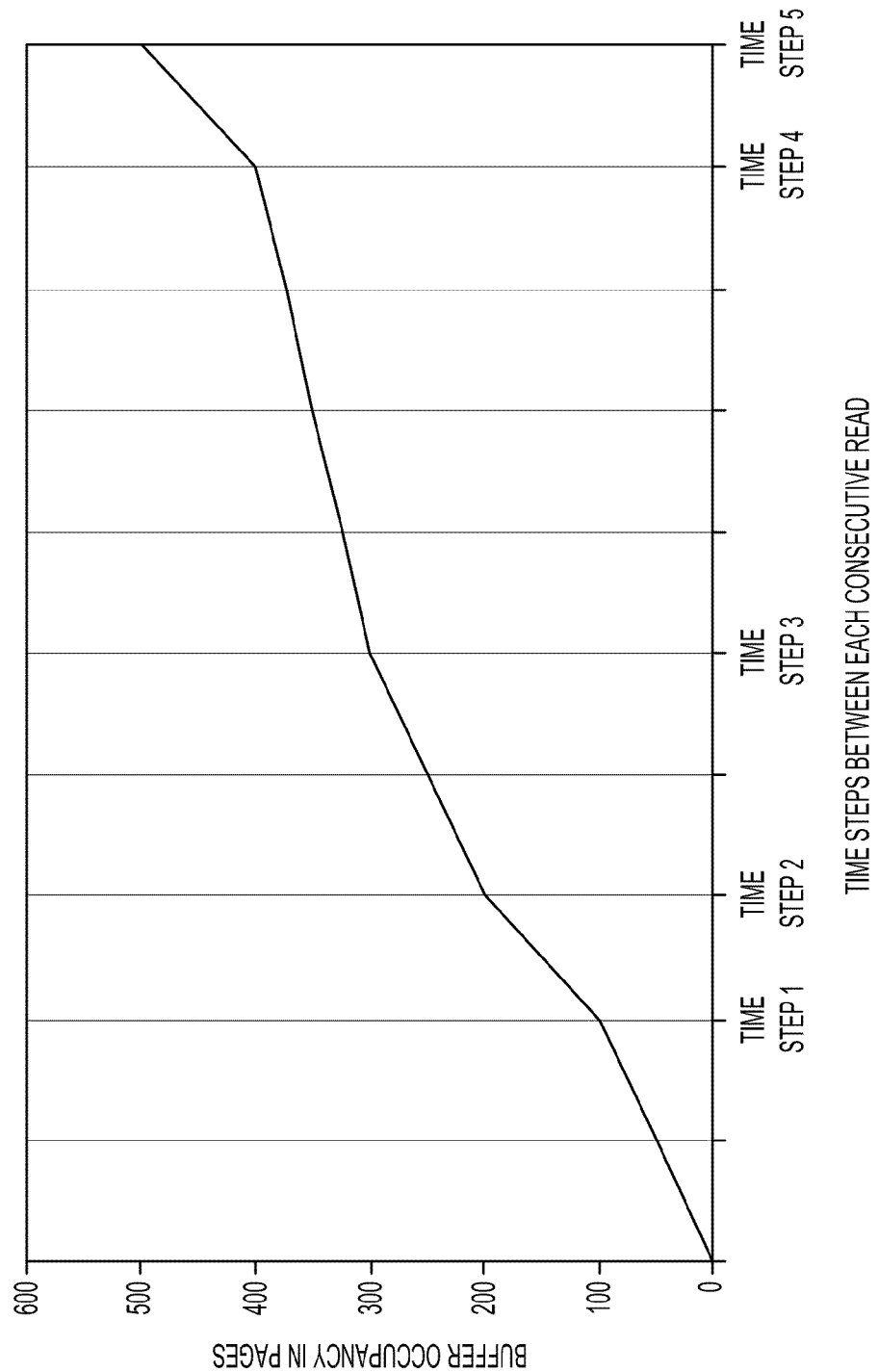
FIG. 8 is an example of a graph of buffer occupancy vs. time which may be obtained.

Reference is now made to FIG. 8. The histogram counters may be read at regular intervals of time where: (1) at time 1, only bin 1 has a non-zero value of 64, (1) at time 2, only bin 2 has a non-zero value of 32, (3) at time 3, only bin 3 has a non-zero value of 64, (4) at time 4, only bin 4 has a non-zero value of 128, (5) at time 5, only bin 5 has a non-zero value of 32, and so on. From this information, a buffer occupancy vs. time graph over a period of time may be deduced, as shown in FIG. 8. In the example of FIG. 8, the slope for zero to time 1 is half of the slope between time 1 and time 2. Additionally, the slope for zero to time 1 is double the slope between time 3 and time 4, and the same as the slope between time 2 and time 3.

Figure 9:
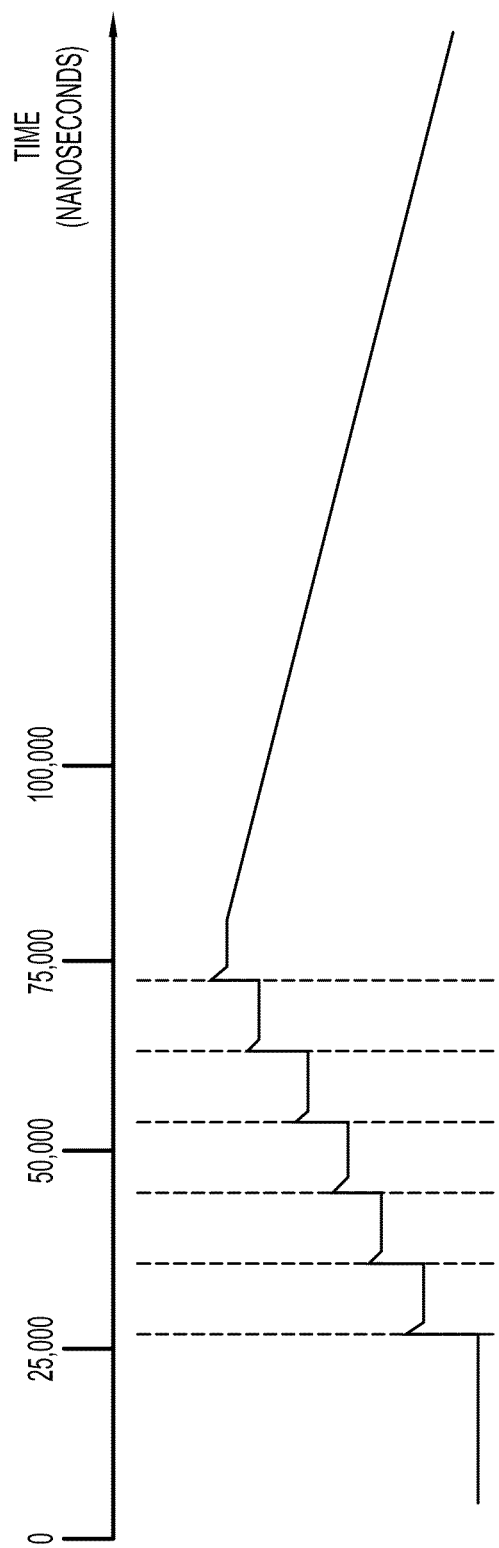
FIG. 9 illustrates an example of simulation results for an example histogram graph.

FIG. 9 illustrates a simulation result in which an example histogram generated in accordance with the above techniques was read six (6) times. Each consecutive read is spaced in time from the previous read by a same time amount. For each read of the buffer, the buffer occupancy increased from the previous read of the buffer.

Figure 10A:
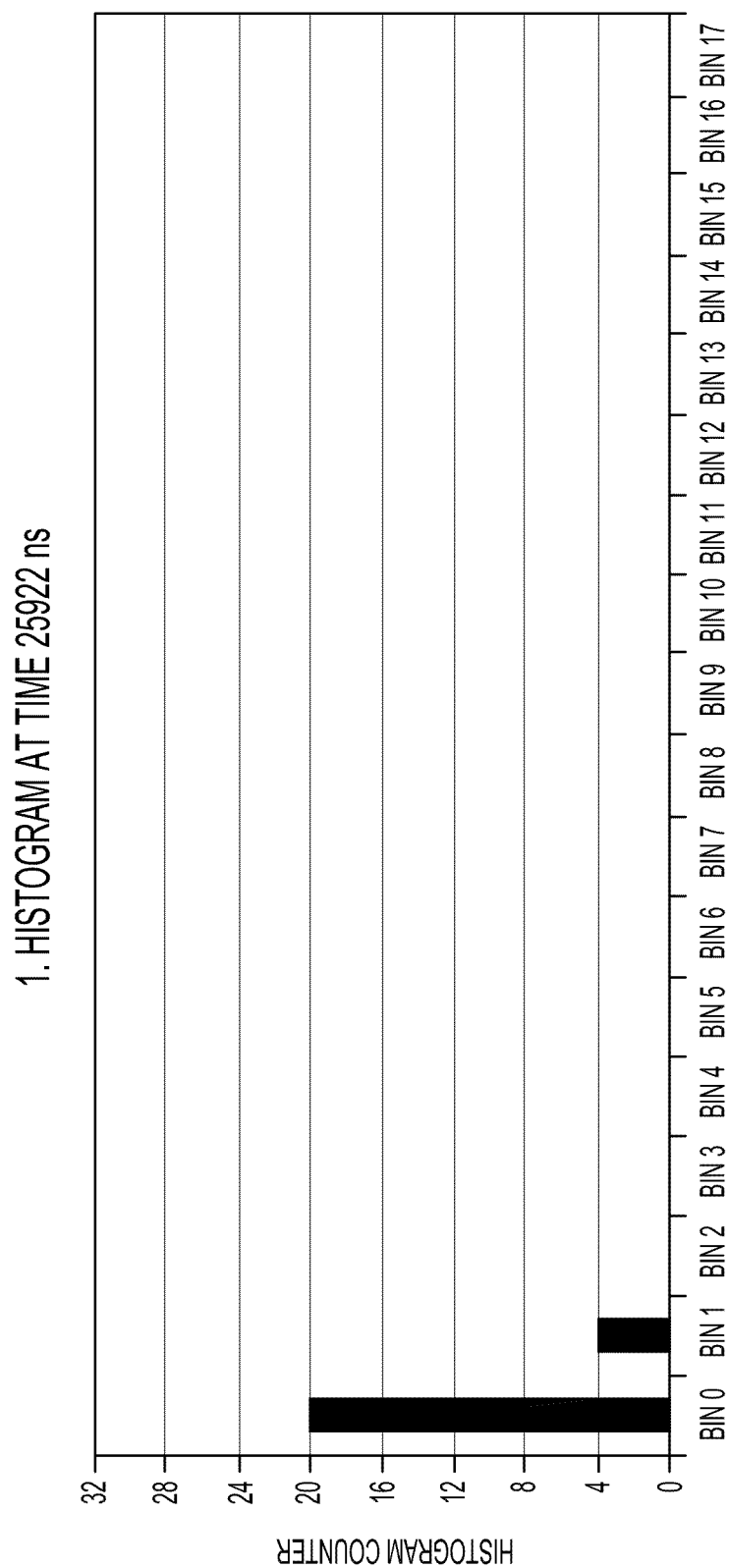
Figure 10B:
Figure 10D:
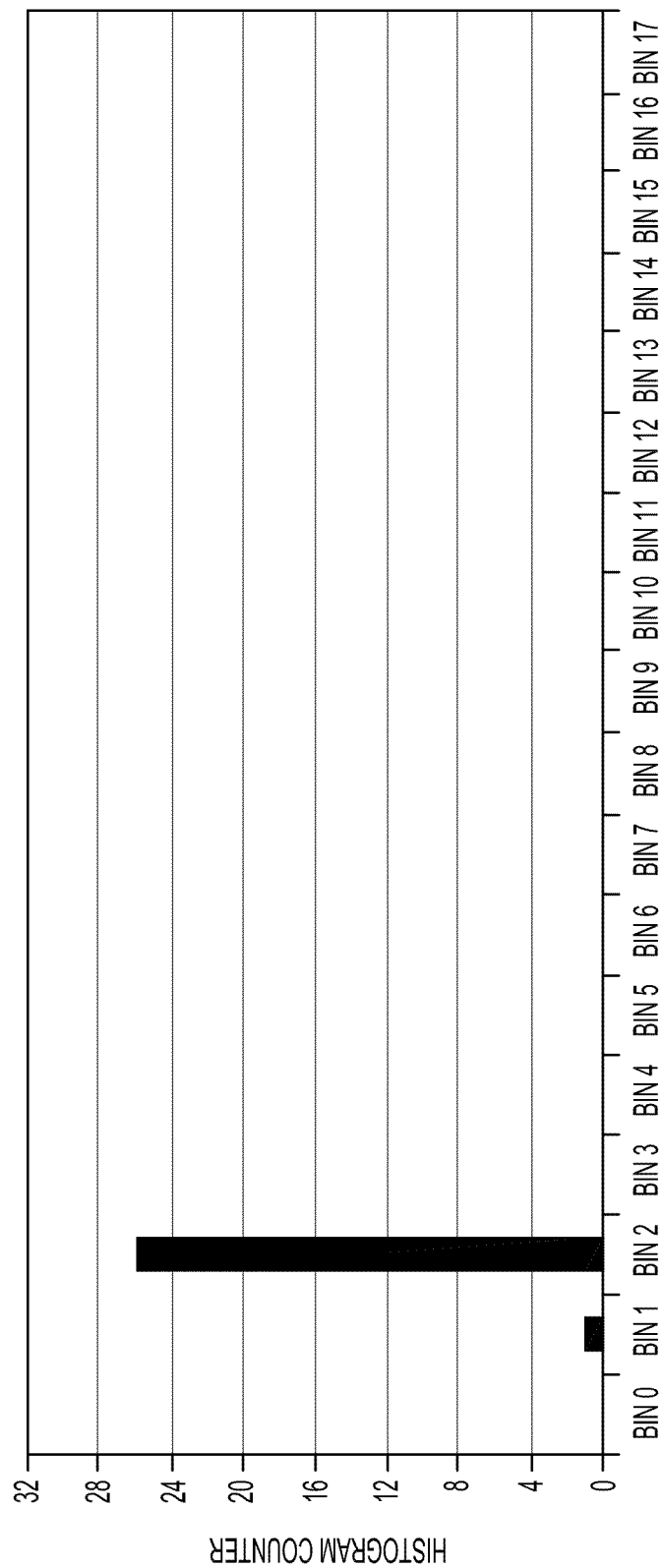
Figure 10E:
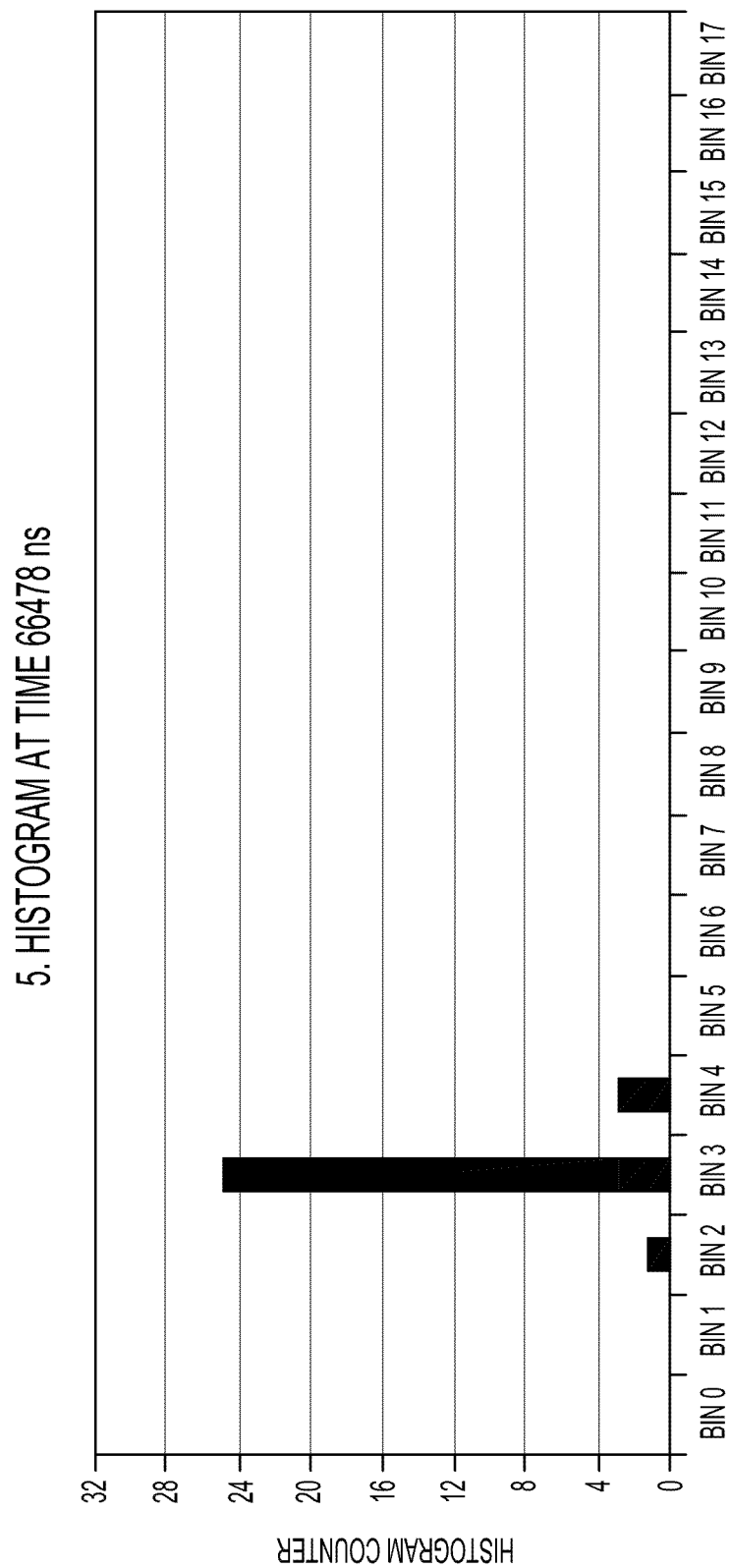

FIGS. 10A-10F show histograms of buffer usage across the entire simulation of FIG. 9. These histograms may be output by the tracking unit 240 of FIG. 2, for example, for use in diagnosing buffer occupancy of a network device during a particular microburst time period. For the histograms shown in FIGS. 10A-10F, there are six markers in time, shown in FIG. 9, which correspond to when the histogram data were collected. More specifically, FIG. 10A illustrates the histogram at marker 1 (time 25922 ns), FIG. 10B illustrates the histogram at marker 2 (time 36503 ns), FIG. 10C illustrates the histogram at marker 3 (time 46023 ns), FIG. 10D illustrates the histogram at marker 4 (time 56250 ns), FIG. 10E illustrates the histogram at marker 5 (time 66478 ns), and FIG. 10F illustrates the histogram at marker 6 (time 77058 ns). As such, FIGS. 10A-10F show in more detailed form the buffer occupancy at the six reads of the buffer as shown in FIG. 9, in which the buffer occupancy increases for each successive read of the buffer.

By enabling the reads via hardware in accordance with techniques described herein, microbursts of packets that may occur in the sub-nanosecond range can be identified, to determine whether or not a buffer is sufficiently sized to handle such microbursts. Software sampling of buffers can be too slow, and may miss a microburst of packets (in which the microburst may start and end in the range of a few microseconds). So, by having software control buffer occupancy monitoring hardware, a user can be provided with information regarding buffer occupancy on a sub-microsecond level, whereby the information can be provided every minute, hour, day, etc., in the form of a report.

Figure 11B:
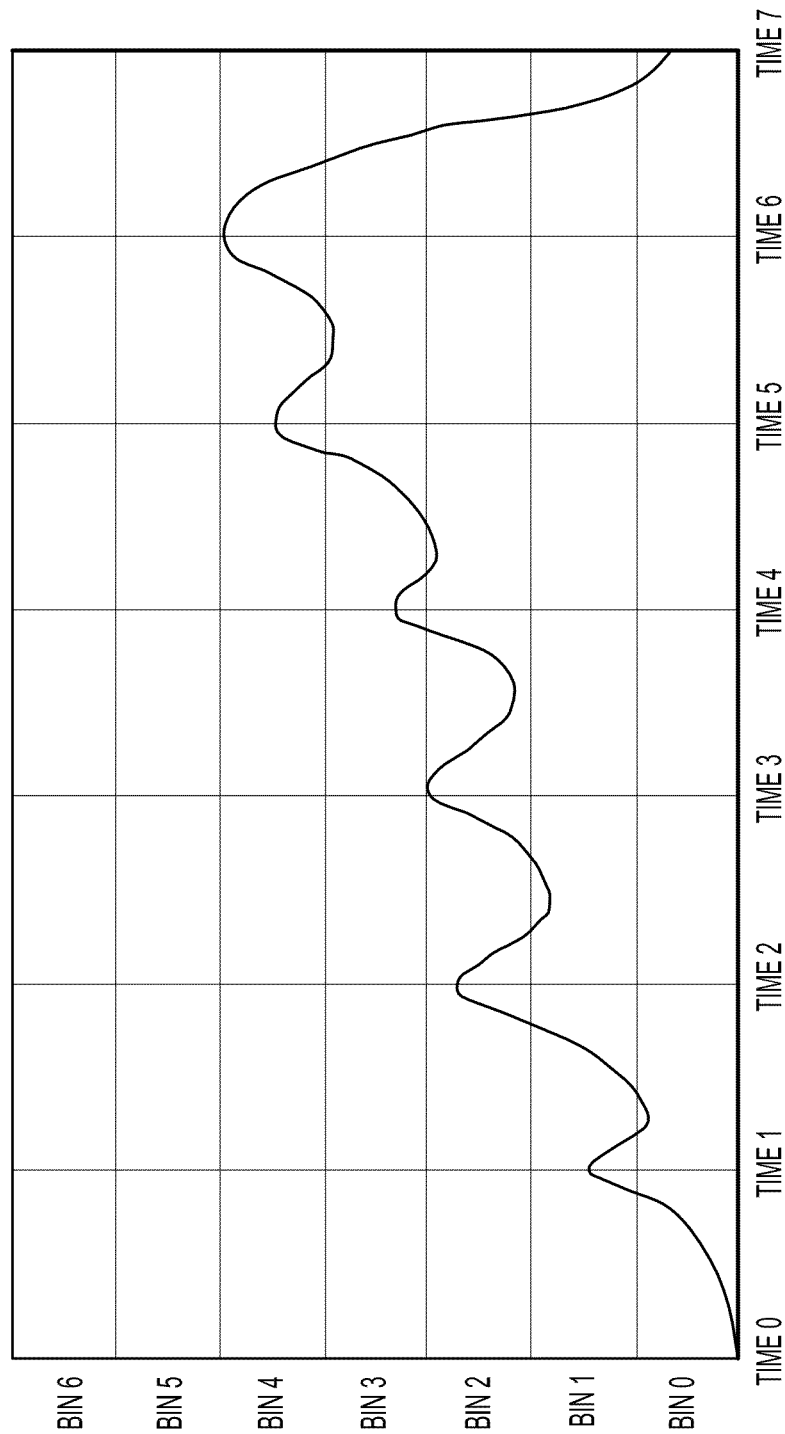

Reference is now made to FIGS. 11A and 11B. If it is desired to reconstruct the buffer usage graph only from the above six histograms, a reconstructed graph may have one of the forms shown in FIGS. 11A and 11B, which may be output by the characterizing unit 250 of FIG. 2, for example.

In these examples, the slope is assumed to decay after marker 6 (time 6) shown in FIG. 9. The thresholds for each bin are in ascending order. Therefore, the y-axis represents the size of the buffer in pages or bytes, while the x-axis represents time. As noted, these example use readings are taken at even intervals of time.

Histogram analytics can be collected in either a port mode or a virtual lane (VL) or virtual buffer mode. In the port mode, the analytics may be collected for 8 unicast (UC) and 8 multicast (MC) VLs, for example. In the VL mode, all egress ports may be selected for analytics collection, for example.

Although example buffer occupancy determination systems and methods are shown in the figures, implementations of the subject matter and the functional operations of the techniques described herein can be implemented in other types of digital electronic circuitry, or in computer software embodied in a tangible medium, firmware, or hardware, including the structures disclosed in this specification and their structural equivalents, or in combinations of one or more of them.

Implementations of the subject matter and the operations of the techniques described herein can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows of the techniques described herein can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter of the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, such as by sending network operational state reports to a network administrator that utilizes the buffer occupancy information.

While this specification contains many specific implementation details, these should not be construed as limitations on the scope of any inventions or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The above description is intended by way of example only.

What is claimed is:

1. A method comprising:
sampling an occupancy level of a buffer at a sampling rate;
tracking occupancy levels of the buffer over time, determined from the sampling;

characterizing traffic flow through a network device based on the occupancy levels; and generating an indication of severity of a congestion event in the network device, wherein tracking occupancy levels comprises:
    assigning each of a plurality of bins to a corresponding one of a plurality of buffer occupancy level ranges of the buffer;
    assigning a counter value to each of the bins; and
    each time the occupancy level is sampled, incrementing the counter value of the bin for the occupancy level range in which the sampled occupancy level is determined to fall.

2. The method of claim 1, wherein sampling, tracking and characterizing are performed based on one or more of: Layer 2 parameters, Layer 3 parameters, Layer 4 parameter, packet payload, packet priority parameters, and any user defined parameter.

3. The method of claim 1, further comprising:
    wherein the indication of severity comprises a color indication, wherein the color indicates the severity of the congestion event.

4. The method of claim 1, further comprising:
    creating a histogram of buffer occupancy levels for the buffer over a period of time based on the counter values for each of the bins.

5. The method of claim 1, wherein none of the plurality of buffer occupancy level ranges correspond to a buffer full or a buffer nearly full condition.

6. The method of claim 1, wherein one of the plurality of buffer occupancy level ranges corresponds to a buffer full or a buffer nearly full condition.

7. The method of claim 1, further comprising:
    assigning an upper threshold for the counter value;
    determining whether the upper threshold has been exceeded for a particular buffer monitoring time period for at least one of the bins; and
    if the upper threshold has been exceeded for at least one of the bins over the particular buffer monitoring time period, determining that a burst of packets was received by the network device.

8. The method of claim 7, wherein if the upper threshold has been exceeded for at least one of the bins over the particular buffer monitoring time period, increasing the upper threshold for each of the bins.

9. The method of claim 7 wherein if the upper threshold has been exceeded for at least one of the bins over the particular buffer monitoring time period, further comprising:
    reassigning the bins to occupancy levels ranges such that the bin for which the upper threshold has been exceeded is provided with a smaller buffer level occupancy range than it previously was assigned, and another of the bins having an upper threshold that was not exceeded is provided with a larger buffer occupancy level range than it previously was assigned.

10. The method of claim 9, wherein if the counter value for the bin for the largest occupancy level range is greater than zero for the particular buffer monitoring time period, further comprising:
    automatically reassigning the bins to cover a larger buffer occupancy level range.

11. The method of claim 10, wherein, if the counter value for the bin for the largest occupancy level range is greater than zero for a particular buffer monitoring time period, further comprising:
    automatically reassigning the bins to cover an entire buffer occupancy level range from completely empty to completely full.

12. An apparatus comprising:
    a plurality ports for receiving packets from a network and outputting packets to the network;
    a buffer configured to temporarily store received packets as they are being processed by a network device; and
    a processor coupled to the buffer and configured to:
        sample an occupancy level of the buffer at a sampling rate;
        track occupancy levels of the buffer over time;
        characterize traffic flow through the network device based on the occupancy levels; and
        generate an indication of severity of a congestion event in the network device,
        wherein the processor tracks occupancy levels by:
            assigning each of a plurality of bins to a corresponding one of a plurality of buffer occupancy level ranges of the buffer;
            assigning a counter value to each of the bins; and
            each time the occupancy level is sampled, incrementing the counter value of the bin for the occupancy level range in which the sampled occupancy level is determined to fall.

13. The apparatus of claim 12, wherein the processor is configured to perform the sample, track and characterize operations based on one or more of: Layer 2 parameters, Layer 3 parameters, Layer 4 parameter, packet payload, packet priority parameters, and any user defined parameter.

14. The apparatus of claim 12, further comprising an indicator configured to show the indication of severity as a color, wherein the color indicates the severity of the congestion event.

15. The apparatus of claim 12, the processor further configured to:
    create a histogram of buffer occupancy levels for the buffer over a period of time based on the counter values for each of the bins.

16. The apparatus of claim 12, the processor is further configured to:
    assign an upper threshold for the counter value;
    determine whether the upper threshold has been exceeded for a particular buffer monitoring time period for at least one of the bins; and
    if the upper threshold has been exceeded for at least one of the bins over the particular buffer monitoring time period, determine that a burst of packets was received by the network device.

17. The apparatus of claim 16, wherein if the upper threshold has been exceeded for at least one of the bins over the particular buffer monitoring time period, the processor is further configured to:
    increase the upper threshold for each of the bins.

18. The apparatus of claim 16, wherein if the upper threshold has been exceeded for at least one of the bins over the particular buffer monitoring time period, the processor is further configured to:
    reassign the bins to occupancy levels ranges such that the bin for which the upper threshold has been exceeded is provided with a smaller buffer level occupancy range than it previously was assigned, and another of the bins having an upper threshold that was not exceeded is provided with a larger buffer occupancy level range than it previously was assigned.

19. The apparatus of claim 18, wherein if the counter value for the bin for the largest occupancy level range is greater than zero for the particular buffer monitoring time period, the processor is further configured to:
  automatically reassign the bins to cover a larger buffer occupancy level range.

20. The apparatus of claim 19, wherein if the counter value for the bin for the largest occupancy level range is greater than zero for the particular buffer monitoring time period, the processor is further configured to:
  automatically reassign the bins to cover an entire buffer occupancy level range from completely empty to completely full.

21. The apparatus of claim 12, wherein none of the plurality of buffer occupancy level ranges correspond to a buffer full or a buffer nearly full condition.

22. The apparatus of claim 12, wherein one of the plurality of buffer occupancy level ranges correspond to a buffer full or a buffer nearly full condition.

23. A non-transitory computer readable tangible storage media encoded with instructions that, when executed by as processor, cause the processor to:
  sample an occupancy level of the buffer at a sampling rate;
  track occupancy levels of the buffer over time;
  characterize traffic flow within the network device based on the occupancy levels; and
  generate an indication of severity of a congestion event in the network device,
  wherein the instructions that cause the processor to track occupancy levels comprise instructions that cause the processor to:
    assign each of a plurality of bins to a corresponding one of a plurality of buffer occupancy level ranges of the buffer;
    assign a counter value to each of the bins; and
    each time the occupancy level is sampled, increment the counter value of the bin for the occupancy level range in which the sampled occupancy level is determined to fall.

24. The computer readable tangible storage media of claim 23, further comprising instructions that cause the processor to perform the sample, track and characterize operations based on one or more of: Layer 2 parameters, Layer 3 parameters, Layer 4 parameter, packet payload, packet priority parameters, and any user defined parameter.

25. The computer readable tangible storage media of claim 23, wherein the instructions further cause the processor to:
  create a histogram of buffer occupancy levels for the buffer over a period of time based on the counter values for each of the bins.

26. The computer readable tangible storage media of claim 25 wherein, if the upper threshold has been exceeded for at least one of the bins over the particular buffer monitoring time period, the instructions further cause the processor to:
  increase the upper threshold for each of the bins.

27. The computer readable tangible storage media of claim 23, wherein the instructions further cause the processor to:
  assign an upper threshold for the counter value;
  determine whether the upper threshold has been exceeded for a particular buffer monitoring time period for at least one of the bins; and
  if the upper threshold has been exceeded for at least one of the bins over the particular buffer monitoring time period, determine that a burst of packets was received by the network device.

28. The computer readable tangible storage media of claim 23, wherein none of the plurality of buffer occupancy level ranges correspond to a buffer full or a buffer nearly full condition.

* * * * *